United States Patent
Yu et al.

(10) Patent No.: US 7,612,543 B2
(45) Date of Patent: Nov. 3, 2009

(54) CURRENT MODE PWM BOOST CIRCUIT AND FEEDBACK SIGNAL SENSING METHOD THEREOF

(75) Inventors: Chien Peng Yu, Hsinchu (TW); Yi Cheng Wang, Hsinchu (TW); Ye Hsuan Yan, Hsinchu (TW)

(73) Assignee: Advanced Analog Technology, Inc., Hsinchu (TW)

( * ) Notice: Subject to any disclaimer, the term of this patent is extended or adjusted under 35 U.S.C. 154(b) by 370 days.

(21) Appl. No.: 11/670,038

(22) Filed: Feb. 1, 2007

(65) Prior Publication Data
US 2008/0074089 A1    Mar. 27, 2008

(30) Foreign Application Priority Data
Sep. 26, 2006    (TW) .............................. 95135493 A

(51) Int. Cl.
*G05F 1/46*    (2006.01)
(52) U.S. Cl. ..................... 323/222; 323/287; 323/288
(58) Field of Classification Search ................. 323/222, 323/285, 287, 288
See application file for complete search history.

(56) References Cited

U.S. PATENT DOCUMENTS

| | | | |
|---|---|---|---|
| 4,837,495 A * | 6/1989 | Zansky | 323/222 |
| 5,001,620 A * | 3/1991 | Smith | 363/89 |
| 6,191,565 B1 * | 2/2001 | Lee et al. | 323/222 |
| 6,225,794 B1 * | 5/2001 | Criscione et al. | 323/283 |
| 6,366,070 B1 * | 4/2002 | Cooke et al. | 323/284 |
| 7,425,819 B2 * | 9/2008 | Isobe | 323/222 |
| 7,479,773 B2 * | 1/2009 | Michishita | 323/282 |
| 2006/0043943 A1 * | 3/2006 | Huang et al. | 323/222 |
| 2006/0176029 A1 * | 8/2006 | McGinty et al. | 323/222 |
| 2007/0108947 A1 * | 5/2007 | Liao | 323/222 |

* cited by examiner

*Primary Examiner*—Jeffrey L Sterrett
(74) *Attorney, Agent, or Firm*—Egbert Law Offices PLLC

(57) ABSTRACT

A feedback signal sensing method includes the steps of: providing a pulse width modulation (PWM) signal having a period; charging a capacitor by a current source during a pulse duration of the period, so as to form an equivalent slope compensation ramp signal; conducting an inductor current flowing from a boost inductor to flow through an equivalent resistor during the pulse duration of the period, so as to form an equivalent inductor current signal; and using a coupling characteristic of the capacitor together with the equivalent slope compensation ramp signal and the equivalent inductor current signal to form a feedback signal.

17 Claims, 3 Drawing Sheets

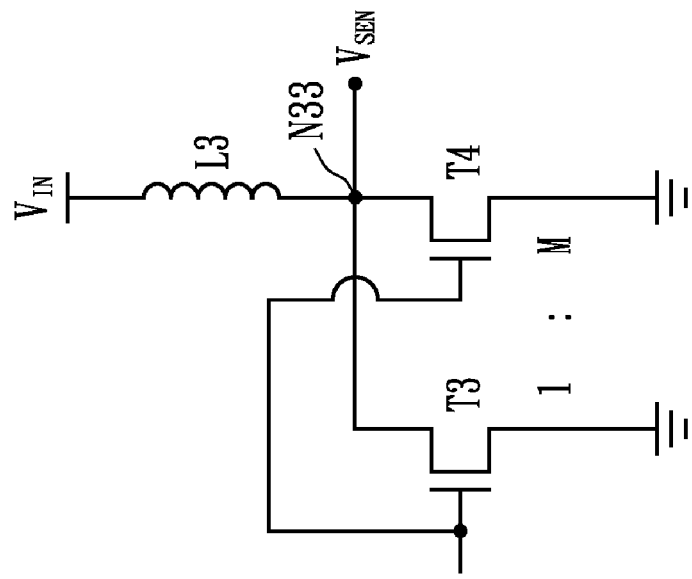
FIG. 2(c) (Prior Art)
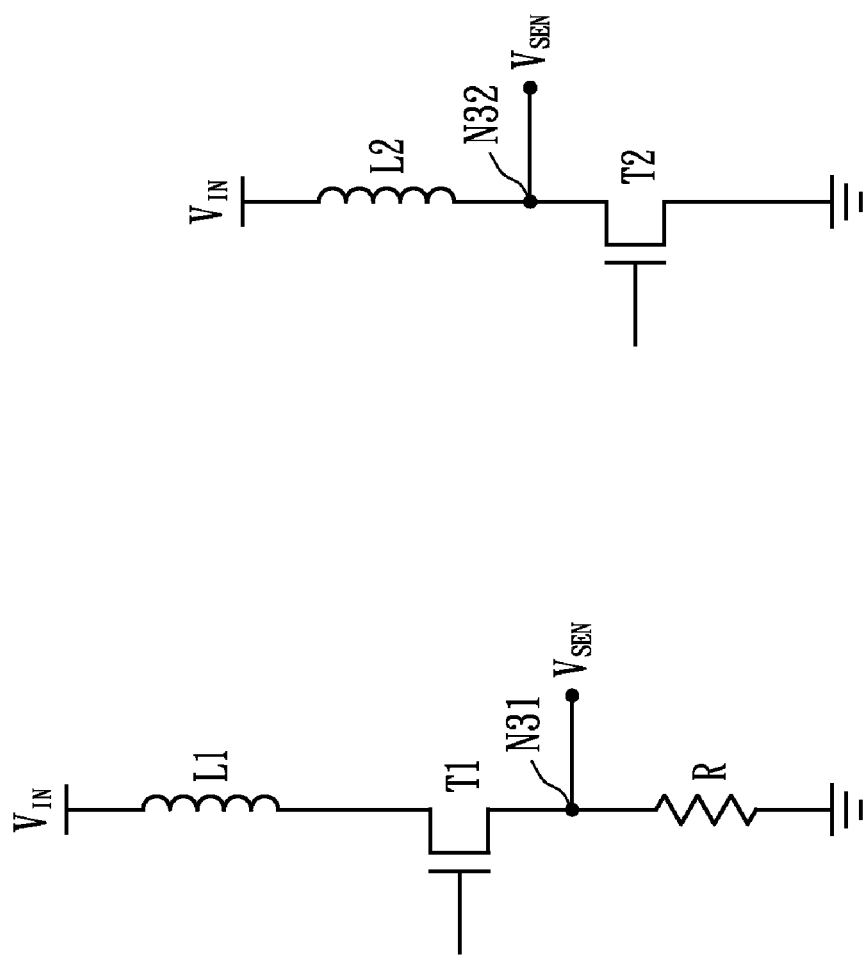
FIG. 2(b) (Prior Art)
FIG. 2(a) (Prior Art)

CURRENT MODE PWM BOOST CIRCUIT AND FEEDBACK SIGNAL SENSING METHOD THEREOF

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a current mode pulse width modulation (PWM) boost circuit and a feedback sensing method thereof. More particularly, the present invention relates to a current mode PWM boost circuit having functions of directly sensing an inductor current and a slope compensation ramp signal and a feedback sensing method thereof.

2. Description of Related Art Including Information Disclosed Under 37 CFR 1.97 and 37 CFR 1.98.

FIG. 1 shows a conventional current mode pulse width modulation (PWM) boost circuit 10, which includes a boost circuit 11, a voltage dividing circuit 19, an error amplifier 12, a comparator 13, an inductor current generator 14, a slope compensation ramp generator 15, an oscillator 16, a pulse width generator 17, and a buffer 18. A voltage $V_{IN}$ is increased by the boost circuit 11 to generate a higher DC output voltage $V_{OUT}$. The boost circuit 11 includes an input capacitor C1, a boost inductor L, a MOS transistor T, a rectifying diode D, and an output capacitor C2. The input capacitor C1 is used to filter out ripple voltage from the voltage $V_{IN}$. When the MOS transistor T is turned on, the rectifying diode D has a reverse bias. At this time, a current flows through the boost inductor L forward, such that the voltage on the boost inductor L increases. However, the current does not flow through the boost inductor L in an instant, but increases linearly and forms an electromagnetic field. At this time, when the MOS transistor T is turned on, the output current is provided by the output capacitor C2 only. When the MOS transistor T is turned off, the boost inductor L cannot store energy, so the electromagnetic field stored in the boost inductor L is released. Thus, the polarity of the voltage on the boost inductor L is inverted, such that the boost inductor L releases the stored energy to the output capacitor C2, and a voltage at a terminal (i.e., the node N3) of the rectifying diode D that is connected to the boost inductor L is higher than the voltage $V_{IN}$. This energy provides a load current, and meanwhile charges the output capacitor C2 again. The voltage dividing circuit 19 includes two resistors R1 and R2, which are connected in series. A divided voltage $V_{F1}$ is acquired at a node N2 that connects the resistors R1 and R2, and is sent to the error amplifier 12 where the divided voltage $V_{F1}$ is compared with a reference voltage $V_{REF}$ to generate an error signal $E_0$. After that, the error signal $E_0$ is compared with a feedback signal $V_{SUM}$ by the comparator 13. The output of the comparator 13 (i.e., $VF_2$) and an oscillation signal S1 coming from the oscillator 16 are input into the pulse width generator 17 together. A driving signal $S_{DR}$ generated by the pulse width generator 17 passes through the buffer 18 to generate a gate control signal $S_G$, so as to adjust the conductive time of the MOS transistor T (i.e., to adjust the pulse duration of the driving signal $S_{DR}$), and further to control the DC output voltage $V_{OUT}$.

The inductor current generator 14 receives a voltage signal $V_{SEN}$ from the node N3, and the voltage signal $V_{SEN}$ is processed by a voltage-to-current transfer structure (e.g., a resistor or a transconductance amplifier) therein to generate an inductor current $I_{SEN}$ flowing through the boost inductor L. FIGS. 2(a)-2(c) illustrate different access points N31, N32, and N33 of the voltage signal $V_{SEN}$ in the conventional art. The method to capture the voltage signal $V_{SEN}$ of FIG. 2(a) is more accurate than the methods of the other two figures, but consumes more power. The methods to capture the voltage $V_{SEN}$ of FIGS. 2(b) and 2(c) are lossless and better than the method of FIG. 2(a), but respectively have problems of lower accuracy and matching. Moreover, after the voltage signal $V_{SEN}$ is processed by the inductor current generator 14, the inductor current $I_{SEN}$ may be easily distorted. Furthermore, the slope compensation ramp generator 15 is directed to solving problems such as open-loop instability, sub-harmonic oscillation, and noise sensitivity in current mode converters when operating in continuous conduction mode with a duty cycle of the driving signal $S_{DR}$ larger than 50%. The slope compensation ramp generator 15 receives an oscillation signal $S_2$ from the oscillator 16, and the oscillation signal $S_2$ is processed by a voltage-to-current transfer structure (e.g., a transconductance amplifier) therein to generate a slope compensation ramp signal $I_{SLO}$. Similarly, after being used by the slope compensation ramp generator 15, the slope compensation ramp signal $I_{SLO}$ may be easily distorted. Finally, the inductor current $I_{SEN}$ and the slope compensation ramp signal $I_{SLO}$ flow through a resistor Rf, and generate the feedback signal $V_{SUM}$ at a node N1.

BRIEF SUMMARY OF THE INVENTION

One aspect of the present invention is to provide a current mode PWM boost circuit, which uses a feedback signal generating unit including a current source and a capacitor to directly measure an inductor current and an equivalent slope compensation ramp signal inside the current mode PWM boost circuit, so as to generate a feedback signal and to adjust a DC output voltage, thereby reducing the problem of signal distortion when measuring an inductor current and generating a slope compensation ramp signal in the conventional art.

Another aspect of the present invention is to provide a feedback signal sensing method applicable to a current mode PWM boost circuit, which directly measures an inductor current flowing through a boost inductor in the boost circuit and a equivalent slope compensation ramp signal formed according to a slope characteristic when a current source charges a capacitor, so as to generate a feedback signal and adjust a DC output voltage.

Accordingly, the present invention discloses a current mode PWM boost circuit, which includes a boost unit, a voltage dividing circuit, an error amplifier, a comparator, a pulse width generator, and a feedback signal generating unit. The boost unit includes a boost inductor and a switch, and the boost unit is configured to increase a voltage to generate a DC output voltage. The voltage dividing circuit is configured for generating a divided voltage from the DC output voltage. The error amplifier is configured to generate an error signal by comparing a reference voltage with the divided voltage. The comparator is configured to generate a first signal by comparing the error signal with a feedback signal. The pulse width generator is configured to receive the first signal and a second signal coming from an oscillator to generate a third signal to control the switch. The feedback signal generating unit is coupled to the boost unit to generate the feedback signal, wherein the feedback signal includes an equivalent inductor current signal flowing through the boost inductor and an equivalent slope compensation ramp signal.

The present invention also discloses a feedback signal sensing method applicable to a current mode PWM boost circuit, which includes the steps of: providing a PWM signal having a period; charging a capacitor by a current source during the a pulse duration of the period to form an equivalent slope compensation ramp signal; conducting an inductor current flowing from a boost inductor to flow through an equivalent resistor during the pulse duration to form an equivalent inductor current signal; and using a coupling characteristic of the capacitor together with the equivalent slope compensation ramp signal and the equivalent inductor current signal to form a feedback signal. In an embodiment of the present invention, the feedback signal is acquired at a connection point of the current source and the capacitor.

The current mode PWM boost circuit of the present invention does not use the voltage-to-current transfer structure, but directly measures the inductor current, and uses the feedback signal generating unit to directly generate the equivalent slope compensation ramp signal. Therefore, compared with the conventional art, the present invention has the advantages of (1) reducing the distortion of the feedback signal; (2) having a favorable response speed because of the direct measurement and signal generation; and (3) eliminating the problem of open-loop instability in the conventional art.

BRIEF DESCRIPTION OF THE SEVERAL VIEWS OF THE DRAWINGS

The invention will be described according to the appended drawings.

FIGS. 2(a)-2(c) are schematic views illustrating different access points of the voltage signal in the conventional art.

DETAILED DESCRIPTION OF THE INVENTION

Figure 1:
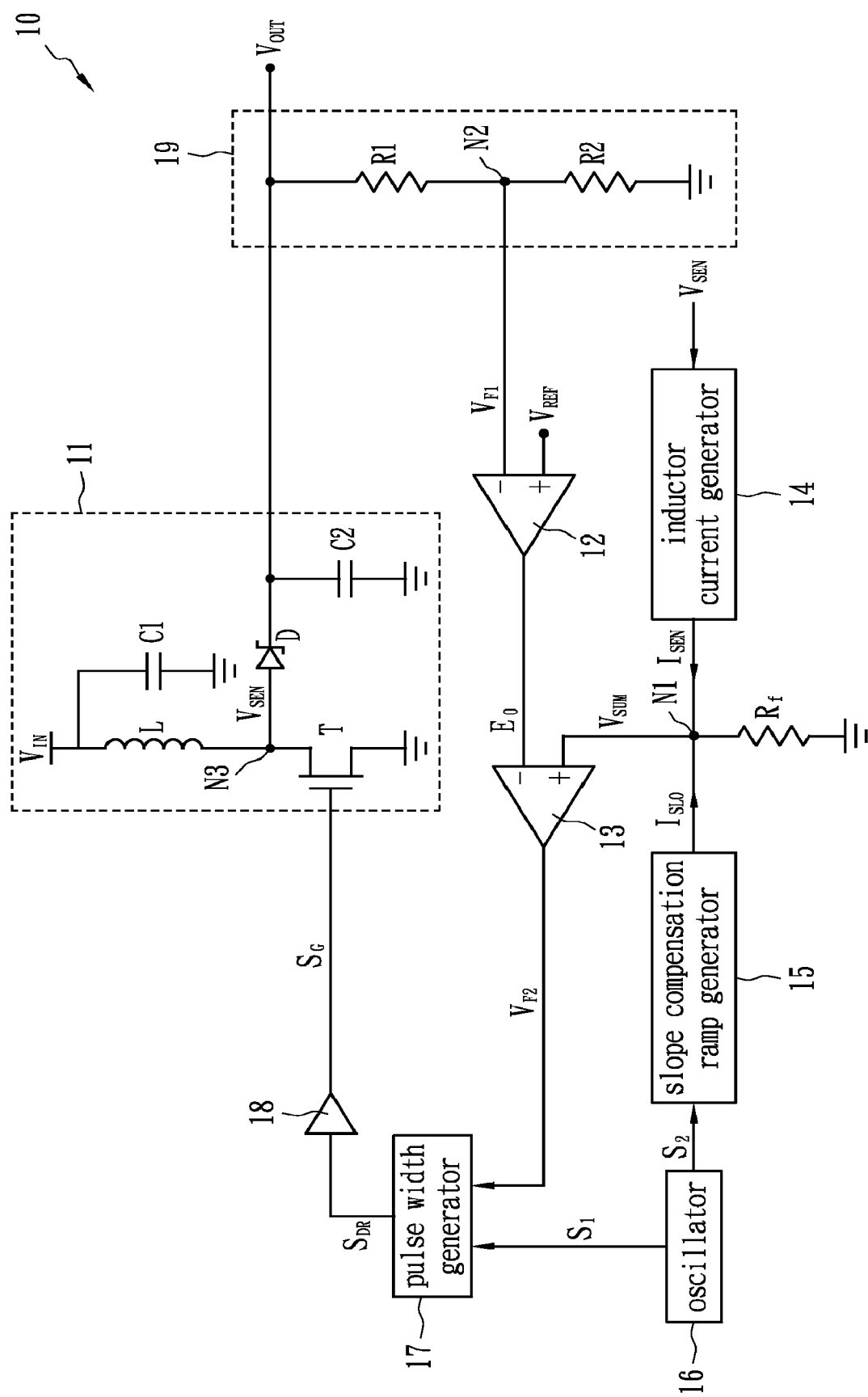
FIG. 1 is a schematic view illustrating a conventional current mode PWM boost circuit.
Figure 3:
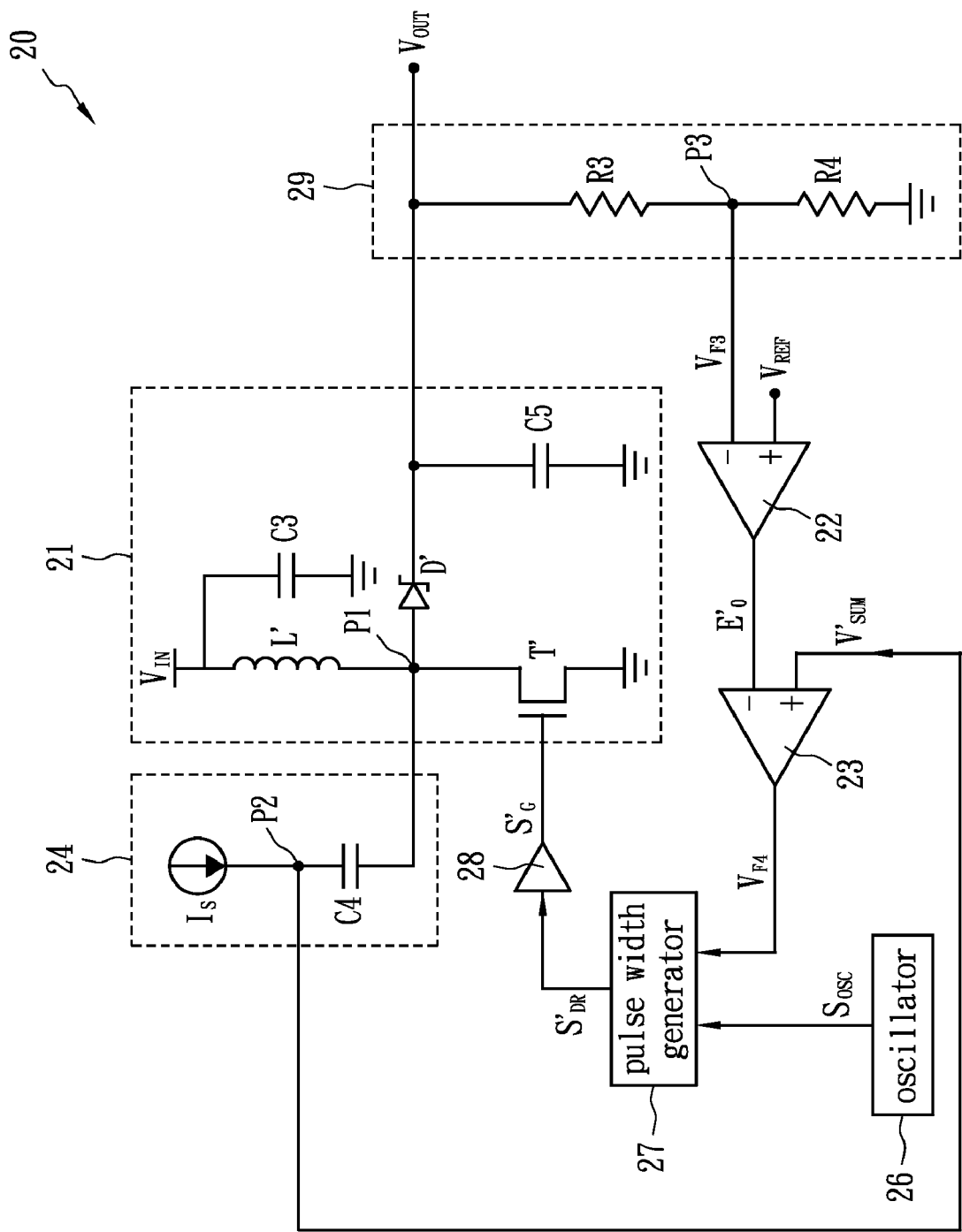
FIG. 3 is a schematic view illustrating a current mode PWM boost circuit according to an embodiment of the present invention.

FIG. 3 illustrates a current mode PWM boost circuit 20 according to an embodiment of the present invention, which includes a boost unit 21, a voltage dividing circuit 29, an error amplifier 22, a comparator 23, a pulse width generator 27, a buffer 28, and a feedback signal generating unit 24. The boost unit 21 includes a boost inductor L', a MOS transistor T', a rectifying diode D' connected to a connection point P1 of the boost inductor L' and the MOS transistor T', an input capacitor C3 for filtering out the ripple voltage from the voltage $V_{IN}$, and an output capacitor C5 connected between the rectifying diode D' and a ground terminal, wherein the output capacitor C5 is used for generating a DC output voltage $V_{OUT}$. The voltage dividing circuit 29 uses the DC output voltage $V_{OUT}$ to generate a divided voltage $VF_3$. The voltage dividing circuit 29 includes a first resistor R3 connected to the rectifying diode D' and a second resistor R4 connected between the first resistor R3 and the ground terminal, wherein the divided voltage $VF_3$ is acquired at a node P3 of connecting the first resistor R3 and the second resistor R4. The error amplifier 22 compares a reference voltage $V_{REF}$ and the divided voltage $VF_3$ to generate an error signal $E'_0$. The comparator 23 compares the error signal $E'_0$ and a feedback signal $V'_{SUM}$ to generate a signal $VF_4$. The pulse width generator 27 receives the signal $VF_4$ and a signal $S_{OSC}$ coming from an oscillator 26 to generate a signal $S'_{DR}$ for controlling the MOS transistor T'. The buffer 28' is optional, and is used to improve the driving capability of the signal $S'_{DR}$, so as to form a gate control signal $S'_G$ to control the MOS transistor T'. The feedback signal generating unit 24 is coupled to the boost unit 21, so as to generate the feedback signal $V'_{SUM}$, in which the feedback signal $V'_{SUM}$ includes an equivalent inductor current signal (not shown) passing through the boost inductor L' and an equivalent slope compensation ramp signal (not shown). The feedback signal generating unit 24 includes a capacitor C4 and a current source $I_S$, which is connected in series with the capacitor C4. A terminal of the capacitor C4 is coupled to the connection point P1 of the boost inductor L' and the MOS transistor T', and the current source $I_S$ is coupled to the other terminal of the capacitor C4.

The current mode PWM boost circuit 20 of the embodiment of FIG. 3 is different from the current mode PWM boost circuit 10 in terms of the method of generating the feedback signal $V'_{SUM}$. The method for sensing the feedback signal $V'_{SUM}$ of the present invention will be illustrated in detail below.

When the MOS transistor T' is turned on, an inductor current $I_L'$ generated by the voltage $V_{IN}$ and passing through the boost inductor L' flows to the ground terminal through the MOS transistor T' that is turned on. A level $V'_{SEN}$ at the node P1 generated by the inductor current $I_L'$ is calculated according to the following formula (1):

$$V'_{SEN} = V_{IN} \times DT_S \times Rds/L \qquad (1)$$

where, $DT_S$ stands for a pulse duration of the fourth signal $S'_{DR}$ (i.e., the conductive time of the MOS transistor T'), Rds stands for the resistance of the MOS transistor T' when being turned on, and L stands for the inductance of the boost inductor L'.

As the level $V'_{SEN}$ includes information about the inductor current $I_L'$, the level $V'_{SEN}$ is also referred to as an equivalent inductor current signal, which is associated with the voltage $V_{IN}$, the boost inductor L', the resistance Rds of the MOS transistor T' when being turned on, and a duty cycle of the pulse width generator. Moreover, the current source $I_S$ charges the capacitor C4 when the MOS transistor T' is turned on, so a voltage difference $V_{SLO}$ is established between the nodes P1 and P2. Such voltage difference is calculated according to the following formula (2):

$$V_{SLO} = I_S \times DT_S/C \qquad (2)$$

where, $DT_S$ stands for the pulse duration of the fourth signal $S'_{DR}$ (i.e., the conductive time of the MOS transistor T'), and C stands for the capacitance of the capacitor C4. As the voltage difference $V_{SLO}$ includes information about the slope compensation ramp signal (i.e., the slope characteristic when the capacitor C4 is charged is similar to the third signal $S_{OSC}$ generated by the oscillator 26), the voltage difference $V_{SLO}$ is also referred to as an equivalent slope compensation ramp signal, which is associated with the current source $I_S$, the capacitor C4, and the duty cycle of the pulse width generator 27. Therefore, according to the coupling characteristic of the capacitor C4, the feedback signal $V'_{SUM}$ acquired at the node P2 is the sum of the equivalent inductor current signal and the equivalent slope compensation ramp signal. In other words, $$V'_{SUM} = V'_{SEN} + V_{SLO} \qquad (3)$$

$$= V_{IN} \times DT_S \times Rds/L + I_S \times DT_S/C$$

$$= (V_{IN} \times Rds/L + I_S/C) \times DTS$$

where, $(V_{IN} \times Rds/L + I_S/C) \times DTs$ in formula (3) has a characteristic of fixed slope.

It is known from the above illustration that the current mode PWM boost circuit and the feedback signal sensing method directly measure the inductor current in the current mode PWM boost circuit and convert the inductor current to an equivalent inductor current signal with a feedback signal generating unit including a current source and a capacitor, and meanwhile charge the capacitor with the current source to directly generate an equivalent slope compensation ramp signal having the slope characteristic, so as to form a feedback signal directly at the connection point of the current source and the capacitor. Therefore, when compared with the conventional art, the present invention has the advantages of (1) reducing the distortion of the feedback signal; (2) having a favorable response speed; and (3) eliminating the problem of open-loop instability.

The above-described embodiments of the present invention are intended to be illustrative only. Numerous alternative embodiments may be devised by persons skilled in the art without departing from the scope of the following claims.

We claim:

1. A feedback signal sensing method, applicable to a current mode pulse width modulation (PWM) boost circuit, said method comprising the steps of:
   providing a PWM signal having a period;
   charging a capacitor by a current source during a pulse duration of said period to form an equivalent slope compensation ramp signal;
   conducting an inductor current flowing from a boost inductor to flow through an equivalent resistor during said pulse duration to form an equivalent inductor current signal; and
   using a coupling characteristic of said capacitor together with said equivalent slope compensation ramp signal and said equivalent inductor current signal to form a feedback signal.

2. The feedback signal sensing method of claim 1, wherein the PWM signal is configured to turn on a switch inside the current mode PWM boost circuit in the pulse duration.

3. The feedback signal sensing method of claim 2, wherein the switch is a MOS transistor.

4. The feedback signal sensing method of claim 1, wherein the equivalent slope compensation ramp signal is defined by the following formula:

$$I_S \times DT_S/C$$

wherein $I_S$ stands for a current of the current source, $DT_S$ stands for the pulse duration, and C stands for the capacitance of the capacitor.

5. The feedback signal sensing method of claim 1, wherein the equivalent slope compensation ramp signal is a voltage difference across two terminals of the capacitor.

6. The feedback signal sensing method of claim 1, wherein the equivalent resistor is a MOS transistor in a conductive state.

7. The feedback signal sensing method of claim 1, wherein the equivalent inductor current signal is a voltage signal, and is defined by the following formula:

$$V_{IN} \times DT_S \times Rds/L$$

wherein $V_{IN}$ stands for a voltage of a voltage source generating the inductor current, $DT_S$ stands for the pulse duration, Rds stands for the resistance of the equivalent resistor, and L stands for the inductance of the boost inductor.

8. The feedback signal sensing method of claim 1, wherein the feedback signal is the sum of the equivalent slope compensation ramp signal and the equivalent inductor current signal.

9. The feedback signal sensing method of claim 1, wherein the feedback signal is acquired at a connection point of the current source and the capacitor.

10. A current mode PWM circuit comprising:
    a boost unit comprising a boost inductor and a switch, said boost unit being configured to increase voltage to generate a DC output voltage;
    a voltage dividing circuit configured for generating a divided voltage from said DC output voltage;
    an error amplifier configured to generate an error signal by comparing a reference voltage with said divided voltage;
    a comparator configured to generate a first signal by comparing said error signal with a feedback signal;
    a pulse width generator configured to receive said first signal and a second signal, said second signal coming from an oscillator to generate a third signal, wherein said third signal is configured to control said switch; said
    a feedback signal generating unit coupled to said boost unit to generate said feedback signal, wherein said feedback signal comprises an equivalent inductor current signal flowing through said boost inductor and an equivalent slope compensation ramp signal, said feedback signal generating unit comprising:
       a capacitor having a terminal coupled to a connection point of said boost inductor and said switch; and
       a current source coupled to another terminal of said capacitor.

11. The current mode PWM boost circuit of claim 10, wherein said boost unit further comprises:
    a rectifying diode connected to said connection point of said boost inductor and said switch; and
    an output capacitor connected between said rectifying diode and a ground terminal to generate said DC output voltage.

12. The current mode PWM boost circuit of claim 11, wherein said voltage dividing circuit comprises:
    a first resistor connected to said rectifying diode; and
    a second resistor connected between said rectifying diode and said ground terminal, wherein the divided voltage is acquired at a connection point of said first resistor and said second resistor.

13. The current mode PWM boost circuit of claim 10, further comprising a buffer connected to an output terminal of said pulse width generator to improve the driving capability of said third signal so as to control said switch.

14. The current mode PWM boost circuit of claim 10, wherein the equivalent slope compensation ramp signal is generated when the current source charges said capacitor with the switch turned on.

15. The current mode PWM boost circuit of claim 10, wherein the equivalent slope compensation ramp signal is associated with a current source, said capacitor, and a duty cycle of said pulse width generator.

16. The current mode PWM boost circuit of claim 10, wherein the equivalent inductor current signal is a voltage signal and is associated with a resistance of said switch when being turned on.

17. The current mode PWM boost circuit of claim 10, wherein the equivalent inductor current signal is a voltage signal and is associated with the voltage, said boost inductor, a resistance of said switch when being turned on, and a duty cycle of said pulse width generator.

* * * * *